United States Patent
Kielwein et al.

(10) Patent No.: US 6,435,442 B1
(45) Date of Patent: Aug. 20, 2002

(54) SENSOR FOR A BELT RETRACTOR

(75) Inventors: Thomas Kielwein, Eschach; Jürgen Rink, Waldstetten; Johannes Schmid, Schwäbisch Gmünd, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/460,336

(22) Filed: Dec. 10, 1999

(30) Foreign Application Priority Data

Dec. 18, 1998 (DE) .................................... 298 22 610 U

(51) Int. Cl.$^7$ .............................................. B60R 22/40
(52) U.S. Cl. ................................ 242/384.4; 242/384.5; 242/384.6
(58) Field of Search .................... 242/384.4, 384.6, 242/384.5; 280/806; 297/478

(56) References Cited

U.S. PATENT DOCUMENTS

| | | | |
|---|---|---|---|
| 4,093,145 A | 6/1978 | Klink | |
| 4,244,537 A | * 1/1981 | Labeur | 242/107.4 |
| 4,262,858 A | 4/1981 | Takada | |
| 4,351,496 A | * 9/1982 | Fohl | 242/107.4 |
| 4,844,374 A | * 7/1989 | Mori | 242/107.4 |

FOREIGN PATENT DOCUMENTS

| | | | |
|---|---|---|---|
| DE | 2420549 A1 | 2/1975 | |
| DE | 2313780 B2 | 12/1975 | |
| DE | 2821152 A1 | 11/1979 | |
| DE | 3008177 A1 | 9/1981 | |
| DE | 9001078 | 5/1990 | |
| GB | 2 070 913 A | * 9/1981 | A62B/35/02 |

* cited by examiner

Primary Examiner—Donald P. Walsh
Assistant Examiner—Joseph Rodriguez
(74) Attorney, Agent, or Firm—Tarolli, Sundheim, Covell, Tummino & Szabo L.L.P.

(57) ABSTRACT

A vehicle-sensitive sensor for a belt retractor for vehicle safety belt systems, comprises an inertia body displaceable in case of decelerations and accelerations of the sensor, and a two-armed lever. A first arm of the two-armed lever forms a coupling pawl, and a second arm of the two-armed lever is able to be engaged by the inertia body such that, in case of a displacement of the inertia body, the lever is pivoted so that the coupling pawl is directed into a clutch toothing.

16 Claims, 7 Drawing Sheets

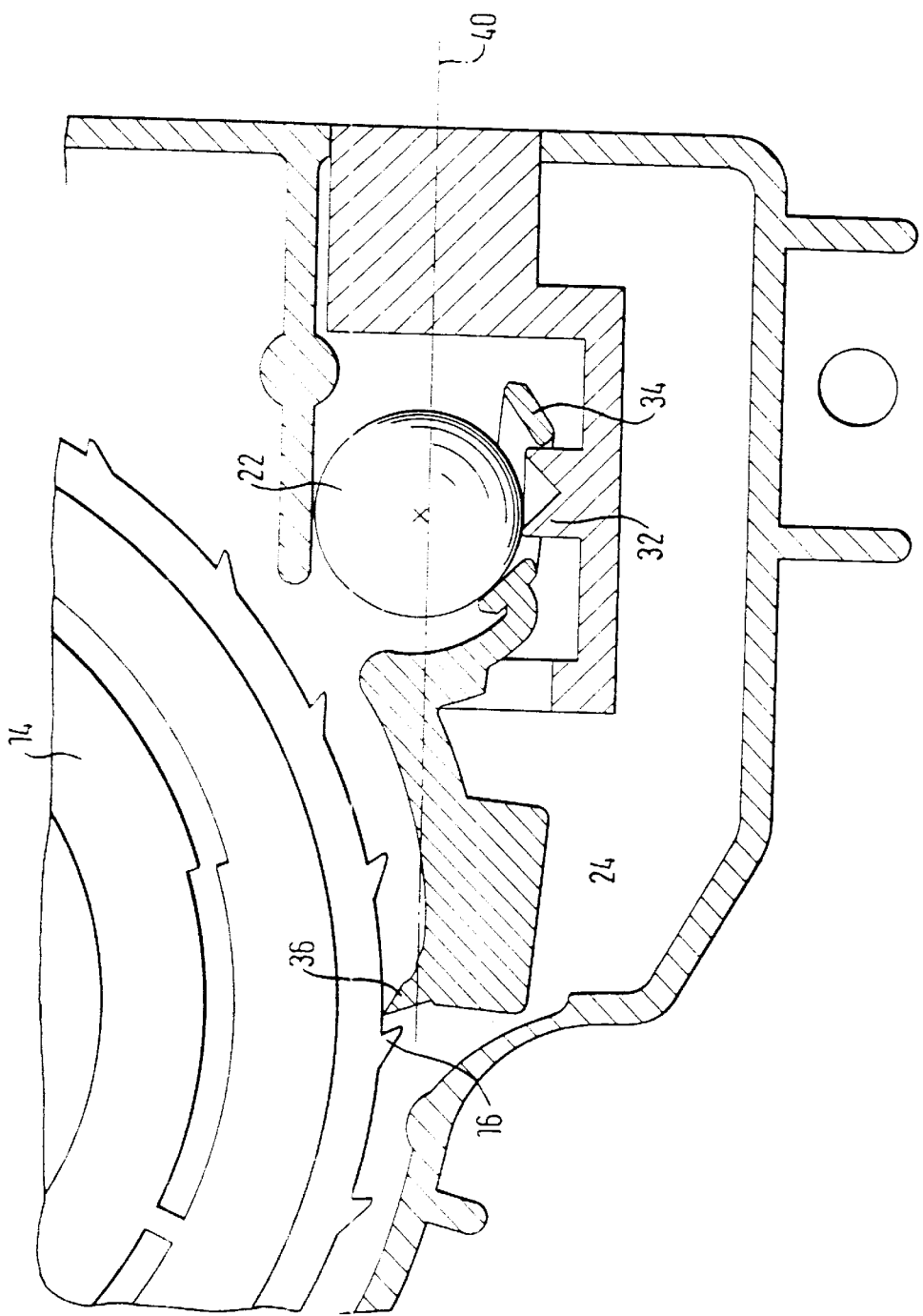

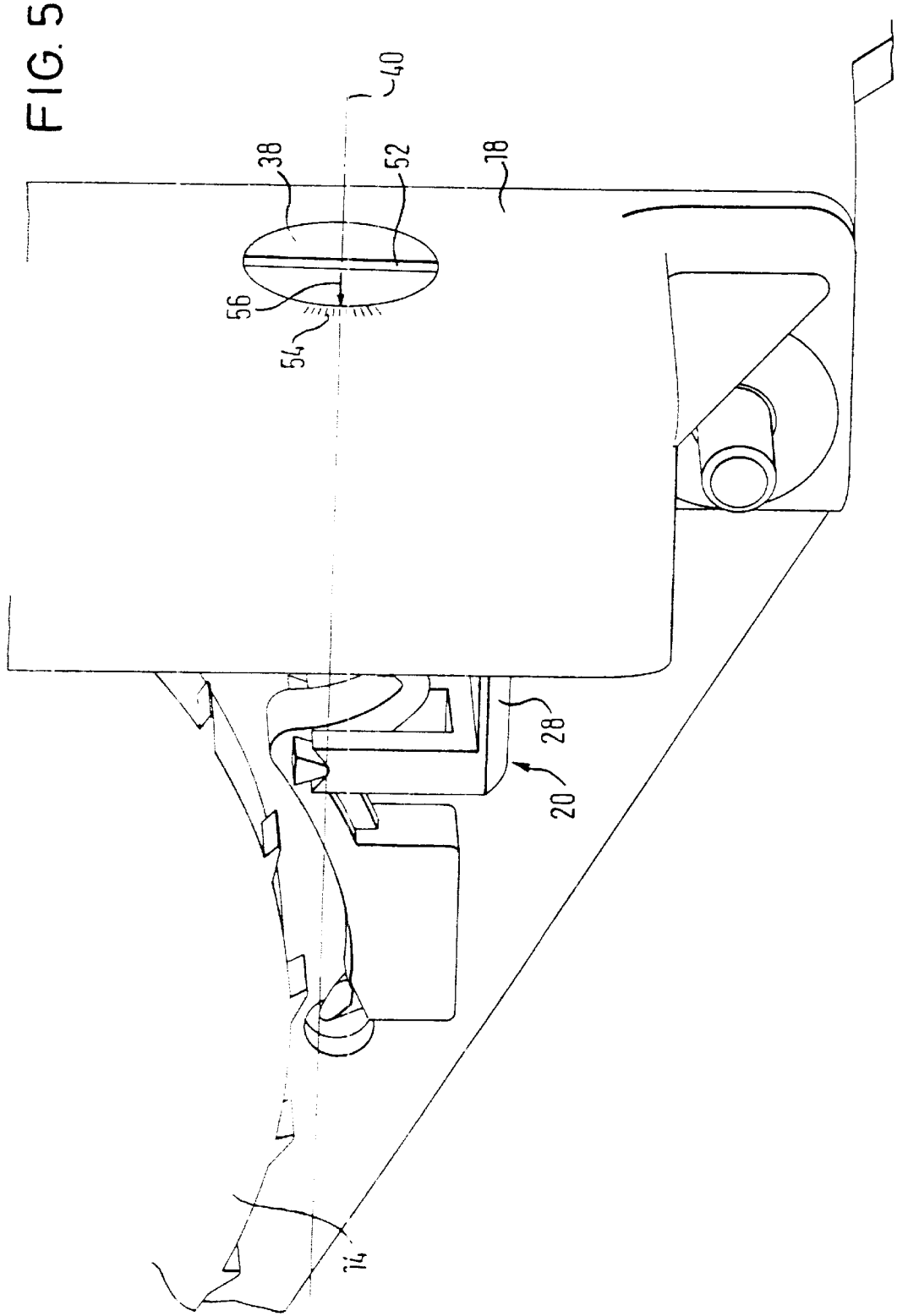

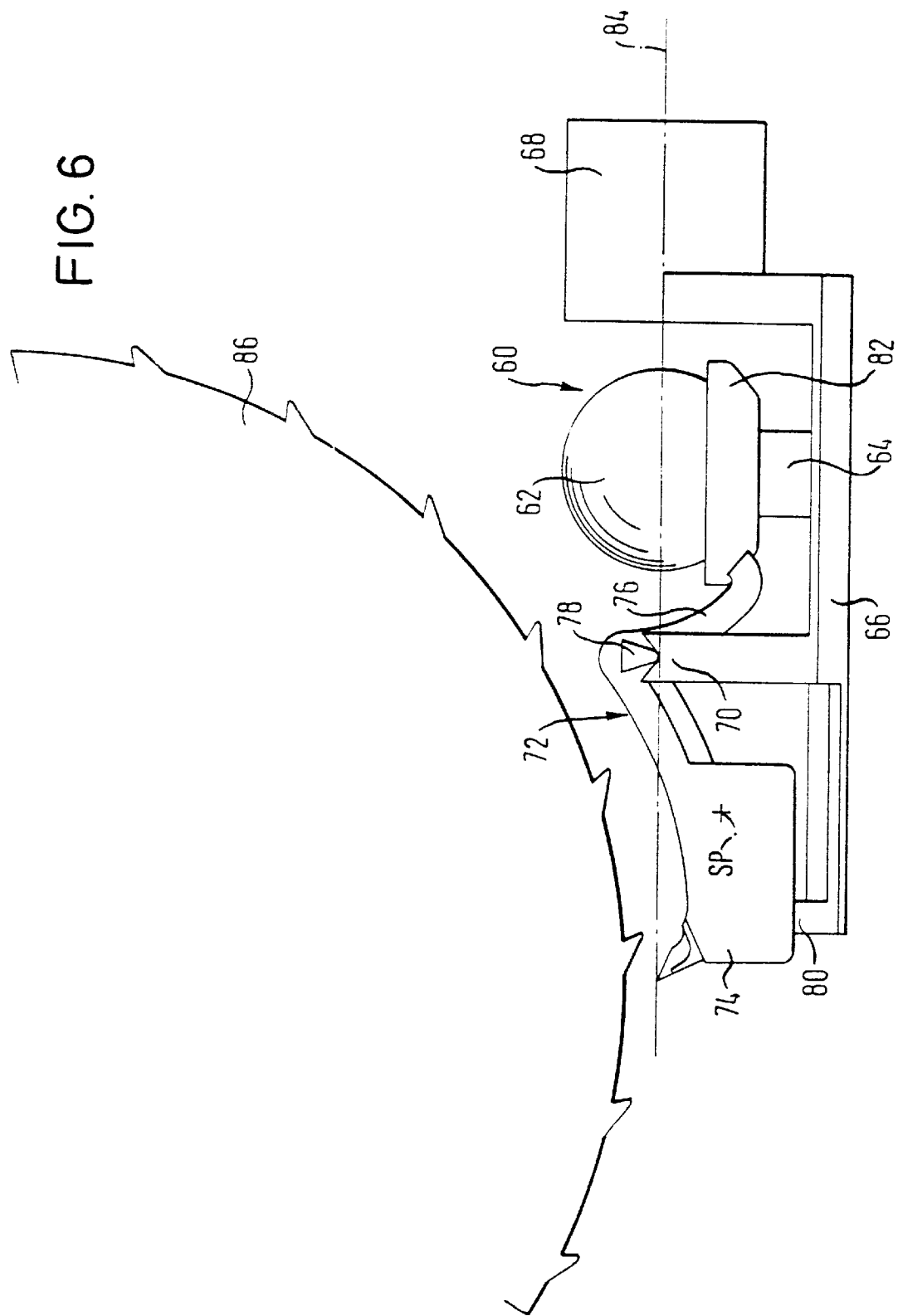

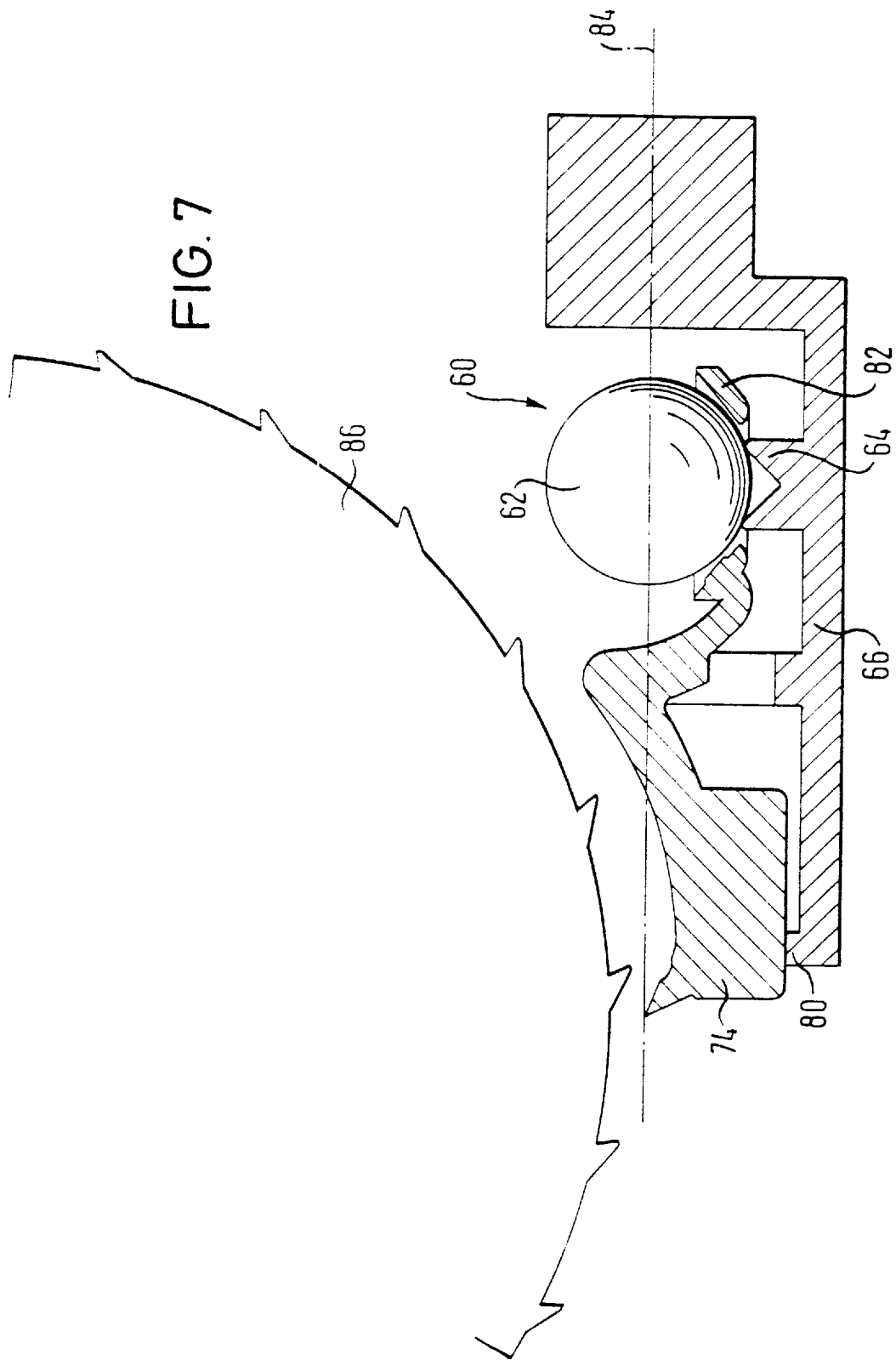

SENSOR FOR A BELT RETRACTOR

TECHNICAL FIELD

The invention relates to a vehicle-sensitive sensor for a belt retractor for vehicle safety belt systems.

BACKGROUND OF THE INVENTION

Belt retractors are widely known components of vehicle safety belt systems. The retractors have a belt spool rotatably mounted in a frame and a blocking mechanism in order to block the belt spool against an unwinding of belt webbing in the case of an impact of the vehicle. The blocking mechanism is controlled by means of the vehicle-sensitive sensor responding to accelerations of the vehicle. Known vehicle-sensitive sensors have a coupling pawl in the form of a one-sided lever, under which a steel ball is arranged. The coupling pawl lies on the steel ball with a depression in the form of a spherical segment. If an intense acceleration occurs in the case of a vehicle impact, then the steel ball moves so that the depression in the form of a spherical segment and hence the coupling pawl are raised. The vehicle-sensitive sensor is arranged here beneath the clutch disc, so that on raising the coupling pawl, the end of the latter is guided into the clutch toothing and hence the blocking mechanism is activated. Conventional vehicle-sensitive sensors are only adaptable in a limited manner to various arrangements in the belt retractor. A further disadvantage of conventional vehicle-sensitive sensors lies in that an installation of the belt retractor which is inclined with respect to the structurally given installation position is not possible, because the gravity then engaging obliquely on the steel ball causes a permanent displacement of the steel ball Connected with a permanent blocking of the belt spool.

BRIEF SUMMARY OF THE INVENTION

Through the invention, a greater flexibility is to be achieved with the arrangement and construction of the vehicle-sensitive sensor for a belt retractor. This is achieved in a sensor which comprises an inertia body displaceable in case of decelerations and accelerations of the sensor, and a two-armed lever. A first arm of the two-armed lever forms a coupling pawl, and a second arm of the two-armed lever is able to be engaged by the inertia body such that, in case of a displacement of the inertia body, the lever is pivoted so that the coupling pawl is directed into a clutch toothing. The provision of a two-armed lever makes possible a substantially more flexible construction of the vehicle-sensitive sensor compared with the prior art. Thus, for example, the distance covered by the end of the coupling pawl, the size and weight of the inertia body and the spatial arrangement of the inertia body in the belt retractor can be easily varied, without having to accept restrictions in the operating reliability.

As a further step, provision is made that the sensor has a housing on which the lever and the inertia sensor are mounted and which is arranged in relation to a reference so as to be pivotal about an adjustment axis, with a nose of the coupling pawl, able to be guided into the clutch toothing, lying on the adjustment axis. Such a construction of the vehicle-sensitive sensor provides the precondition for an adjustment of the vehicle-sensitive sensor on differently inclined installation positions of the belt retractor. The sensor can be pivoted as a unit in the belt retractor, without its release values, i.e. the values which are necessary for a displacement of the inertia body, or the distance covered on displacement of the inertia body from the nose of the coupling pawl changing. Furthermore, the installation angle of inclination may now be adjusted in a simple manner.

In further development of the invention, provision is made that the nose of the coupling pawl, able to be directed into the clutch toothing, a point on the rotation axis of the lever, and the center of gravity of the inertia body lie on the adjustment axis in the state of rest of the sensor. Thereby, a compact sensor unit results, which only has a small space requirement on a rotation about the adjustment axis.

Advantageously the housing is provided with an adjustment cylinder, which is rotatably arranged. The sensor can be arranged for example in a bore of a covering hood before its being fastened to a frame of a belt retractor. An adjustment cylinder also makes possible a rotatable arrangement of the sensor which is simple to produce and in so doing reliable in operation.

Furthermore, provision is made that a display- and adjustment device is provided for the pivot position of the housing in relation to the clutch disc. Owing to these steps, a single type of belt retractor can be adjusted to various installation inclinations, for example for various vehicle types. The display- and adjustment device can be arranged here such that the adjustment can be carried out and detected from the exterior.

Provision is made that the second arm of the lever lies against the inertia body in the state of rest of the sensor. Each displacement of the inertia body is thereby converted directly into a movement of the coupling pawl, whereby a rapid response of the sensor is achieved. As the second arm of the lever lies against the inertia body, in driving operation also no rattling of the lever can occur.

Alternatively, provision is made that the second arm of the lever in the state of rest of the sensor is arranged at a predetermined distance from the inertia body. Here, it is advantageous that the initial displacement of the inertia body is not influenced by friction between the second arm of the lever and the inertia body. The exact adherence to the structurally given acceleration threshold, after which a displacement of the inertia body takes place, is thereby ensured.

As a further step, provision is made that the sensor has a housing with a stop in which an arm of the lever abuts in the state of rest. In this way, a constant predetermined distance can be ensured between the arm of the lever and the inertia body.

It is advantageous if the inertia body is formed by a ball and the second arm has a ring which surrounds a segment of the ball. The provision of a ring which surrounds a segment of the ball makes it possible that the second arm of the lever engages in the lower region of the ball, in which region the ball also sits on a support. Thereby, further design possibilities are opened up for the vehicle-sensitive sensor.

It is advantageous here that the ring has a contact surface facing the ball, which contact surface has substantially the form of a circular conic frustum surface, the generatrix of which is inclined to the central axis of the ring about an angle of approximately 40°. Such a construction of the ring makes possible a low-friction running of the ball onto the ring, so that the acceleration values necessary for guiding the coupling pawl are only negligibly influenced by friction between ball and ring.

It is advantageous if the sensor has a housing with a bearing support to support the lever and a ball support to receive the ball. The ball support is formed here advantageously by a circular cylinder with a conical depression in an end face, so that an annular support surface is produced for the ball. Through an annular support surface, the ball remains at rest as long as an acceleration value given by the structural design is not exceeded. As only an annular surface is in contact with the ball, the ball support is not liable to contamination.

In further development of the invention, the lever can have at least one bearing edge or two bearing points along its rotation axis. These constructions both make possible a low-friction bearing of the lever and, in so doing one that is simple to produce for example by injection molding. Bearing edges can be mounted in a V-shaped depression, whereas bearing points can be constructed in a conical shape and arranged in likewise conical depressions with a greater taper angle than the bearing points.

In an embodiment of the invention, provision is made that the ring arranged on the second arm of the lever is arranged beneath the central point of the ball. A displacement of the ball thereby leads to a downward movement of the second arm and an upward movement of the coupling pawl, so that the sensor can be arranged beneath the clutch disc of the belt retractor. It is advantageous here if the center of gravity of the lever in relation to the rotation axis of the lever lies on the side of the first arm. The ring is thereby urged by gravity in the direction of the ball, so that in the state of rest of the sensor, the abutment of the ring against the ball or, in connection with a stop, a constant distance of the ring from the ball is ensured.

Alternatively, provision is made that the ring arranged on the second arm of the lever is arranged above the central point of the ball. Here, a displacement of the ball leads to an upwards movement of the second arm and a downward movement of the coupling pawl, so that a sensor with these features can be arranged above the clutch disc. In order to ensure also here a constant distance from the ring to the ball or an abutment of the ring against the ball, the center of gravity of the lever in relation to the rotation axis of the lever advantageously lies on the side of the second arm.

BRIEF DESCRIPTION OF THE DRAWINGS

FIG. 3 shows a view similar to FIG. 2 on the occurrence of an intense vehicle acceleration;

FIG. 4 shows a view similar to FIG. 2 with an intense vehicle deceleration;

FIG. 5 shows a perspective partial view of the sensor of FIG. 1 from a different angle of view;

FIG. 6 shows a partial view of a vehicle-sensitive sensor of a second embodiment; and FIG. 7 shows a side view, partially in section, of the sensor illustrated in FIG. 6.

DETAILED DESCRIPTION OF THE INVENTION

Figure 1:
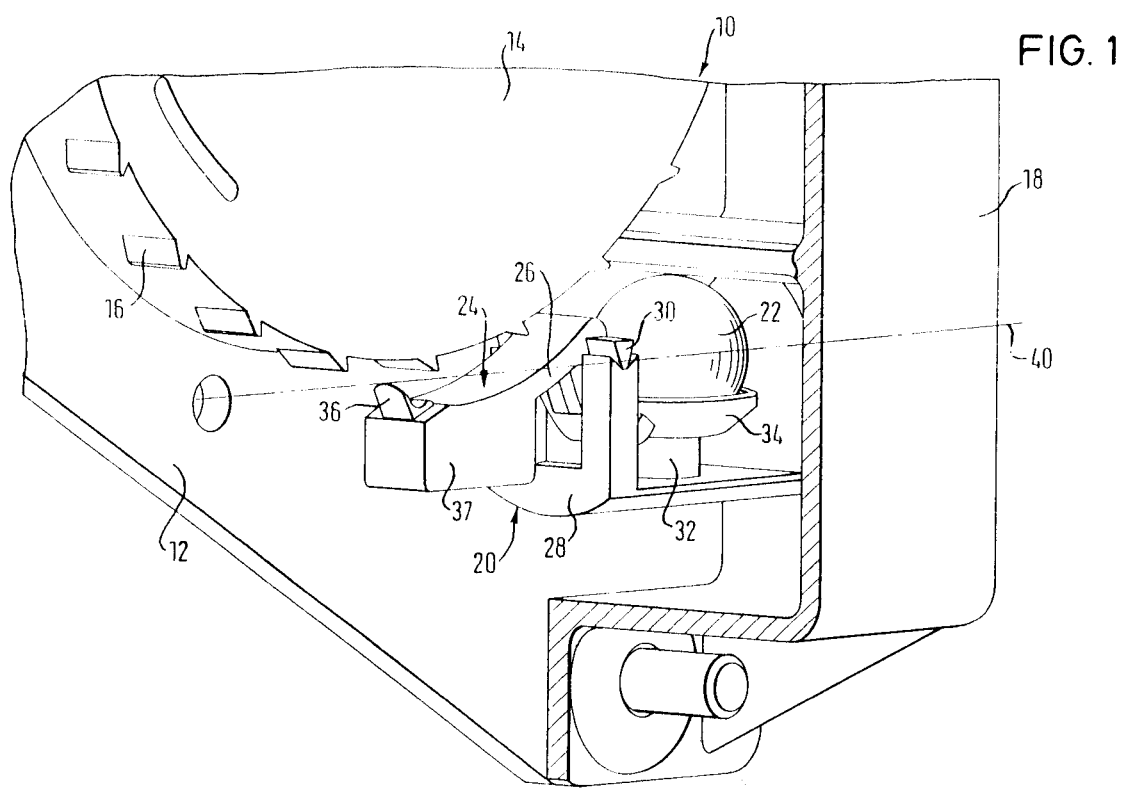
FIG. 1 shows a perspective partial view of a sensor according to the invention in accordance with a first embodiment.

FIG. 1 shows a perspective partial view of a belt retractor 10 comprising a sensor according to a first embodiment. The belt retractor 10 has a frame 12 and a conventional belt spool (not shown) rotatably mounted in the frame 12. Of a conventional blocking mechanism for the selective, non-rotatable blocking of the belt spool to the frame 12, merely a clutch disc 14 with clutch toothing 16 is illustrated. A covering hood 18 is fastened to the frame 12, which hood 18 is illustrated partially in section. The vehicle-sensitive sensor 20 is provided to activate the blocking mechanism in the case of intense accelerations or decelerations of the vehicle. The sensor 20 has a metal ball 22 acting as inert mass and has a coupling pawl 24, which can be directed by a displacement of the ball 22 into the clutch toothing 16 of the clutch disc 14. The coupling pawl 24 forms here a first arm of a two-armed lever 26, on the second arm of which the ball 22 engages in the case of a displacement. The two-armed lever 26 is mounted on a sensor housing 28 which in turn is fastened to the covering hood 18. In order to achieve a low-friction mounting of the lever 26, the latter has two bearing edges 30 which rest each on the sensor housing 28 in a V-shaped depression. In the housing 28 in addition a ball support 32 is formed, on which the ball 22 lies. The second arm of the lever 26 has at its end facing the ball 22 a ring 34 which surrounds a segment of the ball 22 and is arranged concentrically to the ball support 32. The coupling pawl 24 is provided with a nose 36 which on a displacement of the ball 22 engages into the clutch toothing 16. Furthermore, the coupling pawl 24 has a weight 37, which ensures that the ring 34 lies against the ball 22.

Figure 2:
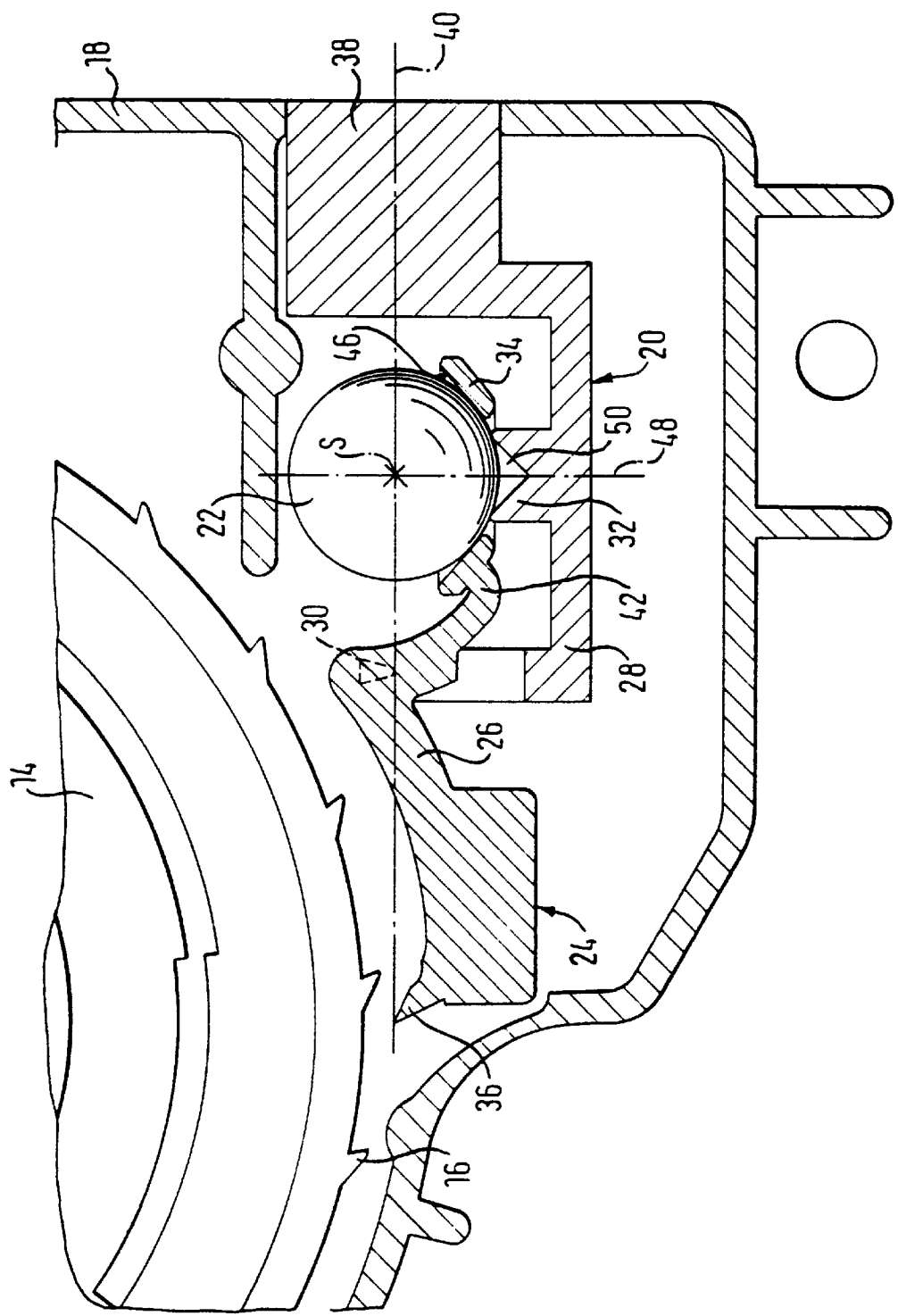
FIG. 2 shows a partial view, partially in section, of the sensor of FIG. 1.
Figure 2:
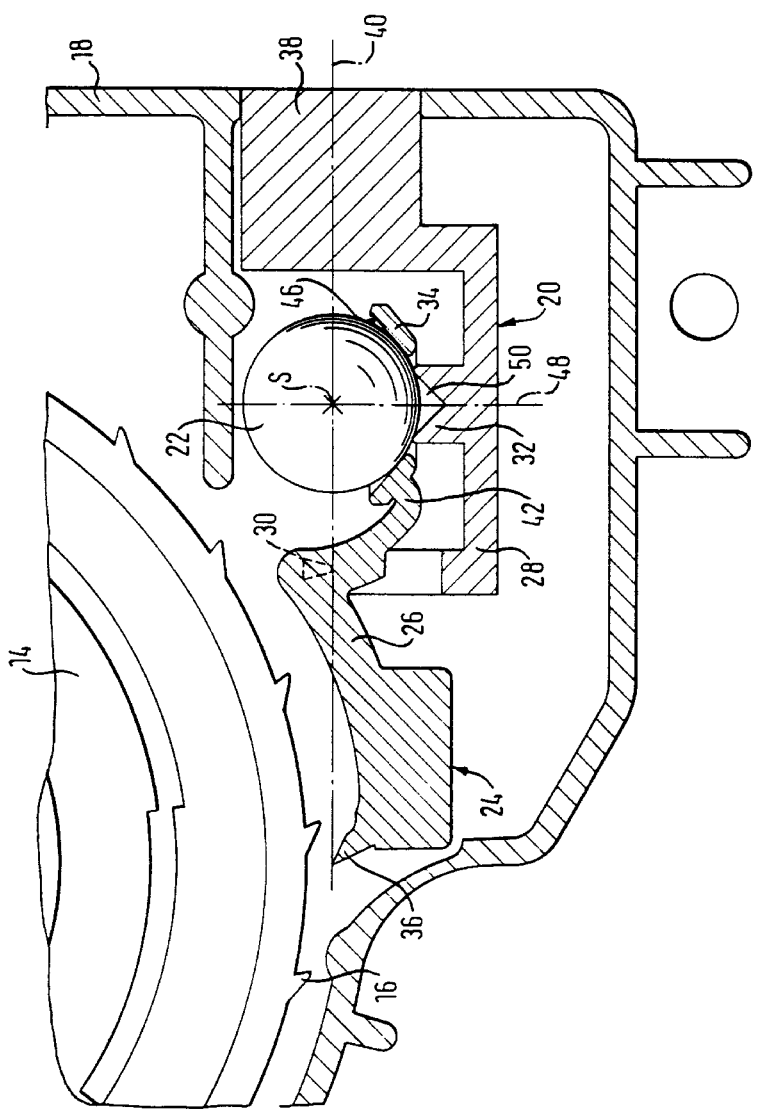

In the side view of FIG. 2, the sensor housing 28, the two-armed lever 26 and the covering hood 18 are illustrated in section. The sensor housing 28 has at its end facing away from the coupling pawl 24 an adjusting cylinder 38, which is arranged in a bore in the covering hood 18. The sensor housing 28 is thereby arranged on the covering hood 18 so as to be rotatable about an adjustment axis 40. As can be readily seen in FIG. 2, which shows the state of rest of the vehicle-sensitive sensor 20, the foremost point of the nose 36 of the coupling pawl 24, the edge of the bearing edges 30 indicated in dashed lines, i.e. the rotation axis of the lever 26, the center of gravity S of the ball 22 and the longitudinal axis of the adjusting cylinder 38 lie on the adjustment axis 40. The sensor 20 can thereby be rotated about the adjustment axis 40 and hence can be aligned to the direction of the acceleration due to gravity, without its release characteristics changing. As can be further seen from FIG. 2, a rotation of the sensor 20 about the adjustment axis 40 also does not alter the distance of the nose 36 from the clutch toothing 16 on the clutch disc 14, because the point of the nose 36 lies on the adjustment axis 40 and, as can be seen in FIG. 1, the point 36 is rounded in a circular shape. Also with the sensor 20 rotated about the adjustment axis 40, the point of the nose 36 has substantially always the same distance from the toothing 16 of the clutch disc 14.

In FIG. 2 also the second arm 42 of the lever 26 can be seen, which has at its end facing the ball 22 the ring 34. The ring 34 surrounds a ball segment of the ball 22 and lies with its contact face 46 against the ball 22. The contact face 46 has the form of a circular frustum surface. A generatrix of this circular frustum surface is inclined here by approximately 40° to the central axis 48 of the ring 34, which also runs through the center of gravity S of the ball 22.

The ball 22 rests on the ball support 32, which is formed by a circular cylinder integral with the housing 28, which cylinder has a conical depression 50 in its end face facing the ball 22. The ball 22 thereby lies on an annular support surface.

FIG. 3 shows a view corresponding to FIG. 2, in which, however the ball 22 owing to an intense vehicle acceleration, for example by a rear impact of a further vehicle, is displaced to the right. In so doing, the ball 22 only then moves in the manner illustrated in FIG. 3, when it is raised partially from the annular support surface of the ball support 32 through the action of the acceleration. With such a movement, the center of gravity S of the ball 22 also shifts upwards. In order to achieve a displacement of the ball 22, an acceleration is therefore necessary, which exceeds a particular threshold. This threshold can be set by the weight of the ball 22, the diameter of the ball 22 and also by the diameter of the annular support surface of the ball support 32. The displacement of the ball 22 illustrated in FIG. 3 leads to the ring 34 being pressed downwards Consequently also the second arm 42 of the lever 26 is pressed downwards, so that the first arm or the coupling pawl 24 moves upwards. Consequently, the nose 36 of the coupling pawl 24 arrives into the region of the clutch toothing 16 of the clutch disc 14, and with a rotation of the belt spool and hence of the clutch disc 14, the blocking mechanism for the belt spool is activated.

FIG. 4 shows the conditions in the case of an intensive deceleration acting on the vehicle, for example with a frontal impact. Under the action of the intensive acceleration then occurring, the ball 22 is displaced to the left, whereby the ring 34 is pressed downwards. Also, with an intensive deceleration of the vehicle, as shown in FIG. 4, the coupling pawl 24 is thereby deflected upwards and the nose 36 arrives into the region of the clutch toothing 16 on the clutch disc 14, so that with a rotation of the belt spool the blocking mechanism is activated.

The perspective view of FIG. 5 shows, in part from obliquely to the rear, the belt retractor illustrated in FIGS. 1 to 4 and with the sensor according to the invention. It can be seen in FIG. 5 that the adjusting cylinder 38 is accessible from the exterior of the covering hood 18 and has a slit 52 via which, for example with the aid of a screw driver, the sensor 20 can be turned about the adjustment axis 40. In order to indicate the pivot position of the sensor 20 and of the sensor housing 28, respectively, in relation to the frame 12 which serves as a reference, and in relation to the clutch disc 14, the covering hood 18 is provided on the periphery of the bore receiving the adjusting cylinder 38 with a scale 54. The adjusting cylinder 38 in turn has an arrow 56 which points to the scale 54.

A vehicle-sensitive sensor 60 of a second embodiment is illustrated in FIG. 6. This sensor 60 is also provided with a ball 62 which lies on a ball support 64 of a sensor housing 66, which housing is further provided with an adjusting cylinder 68 and a bearing support 70. Resting on the bearing support 70 is a two-armed lever 72, which as first arm has a coupling pawl 74 and has a second arm 76. The lever 72 is mounted on the bearing support 70 by means of two bearing edges 78, of which only one is to be seen in FIG. 6. In order to hold the two-armed lever 72 reliably on the bearing support 70 and at the same time to ensure a low-friction mounting, the bearing support 70 is cut in a V-shape, the opening angle of the V-shaped cut of the bearing support 70 being greater than the angle of the bearing edges 78. The sensor housing 66 has a stop 80 on which the coupling pawl 74 rests. In the state of rest of the sensor 60, the coupling pawl 74 always lies here against the stop 80, because the center of gravity SP of the two-armed lever 72 in relation to the rotation axis of the lever 72, which is established by the contact line between bearing support 70 and bearing edges 78, lies on the side of the coupling pawl 74. Through the abutment of the coupling pawl 74 against the stop 80, consequently in the state of rest of the sensor 60 also the position of a ring 82 is established, which is arranged on the second arm 76 and surrounds the ball 62 and the ball support 64 in parts.

The sensor 60 illustrated in FIG. 6 is illustrated partially in section in FIG. 7. In this sectional view, it can be seen that the ring 82 in the state of rest of the sensor is arranged at a predetermined distance from the ball 62. This is achieved in that, as explained with regard to FIG. 6, the coupling pawl 74 resting on the stop 80. A displacement of the ball 62 taking place owing to an acceleration acting on the ball 62 thereby takes place unaffected by any possible friction between the contact surface of the ring 82 and the surface of the ball 62. The structurally given acceleration threshold, as of which a displacement of the ball 62 takes place, is thereby insensitive to an increase in the friction between the ring 82 and the ball 62, as can take place for example by the aging of the materials or contamination.

What is claimed is:

1. A vehicle-sensitive sensor for a belt retractor for vehicle safety belt systems comprising:

an inertia body displaceable in case of decelerations and accelerations of said sensor and a two-armed lever, a first arm of said two-armed lever forming a coupling pawl and a second arm of said two-armed lever engaging said inertia body such that, in case of displacement of said inertia body, said lever is pivoted to direct said coupling pawl into a clutch toothing, said inertia body being formed by a ball, said second arm having a ring which surrounds a segment of said ball, wherein said sensor has a housing with a ball support to receive said ball, said ring being arranged concentrically to said ball support, said second arm of said lever engaging a lower segment of said ball in which segment said ball also engages said ball support, wherein said lever and said inertia body are mounted on said housing and said housing is arranged so as to be pivotal about an adjustment axis in relation to a reference, said coupling pawl having at least one nose which is directed into said clutch toothing and lies on said adjustment axis.

2. The sensor of claim 1, wherein said nose of said coupling pawl directed into said clutch toothing, a point on a rotation axis of said lever, and the center of gravity of said inertia body lie on said adjustment axis in a state of rest of said sensor.

3. The sensor of claim 1, wherein said housing is provided with an adjusting cylinder fastened rotatably.

4. The sensor of claim 1, wherein a device is provided for displaying and adjusting a pivoted position of said housing in relation to a reference.

5. The sensor of claim 1, wherein said second arm of said lever lies against said inertia body in said state of rest of said sensor.

6. The sensor of claim 1, wherein said second arm of said lever is arranged at a predetermined distance from said inertia body in said state of rest of said sensor.

7. The sensor of claim 6, wherein said sensor has a housing with a stop against which an arm of said lever lies in said state of rest of said sensor.

8. The sensor of claim 1, wherein said ring has a contact surface facing said ball, which contact surface has substantially the form of a circular conic frustum surface, the generatix of which is inclined by an angle of approximately 40° to a central axis of said ring.

9. The sensor of claim 1, wherein said housing has a bearing support to support said lever.

10. The sensor of claim 9, wherein said ball support is formed by a circular cylinder with a conical depression in one end face.

11. The sensor of claim 1, wherein said lever has at least one bearing edge along its rotation axis.

12. The sensor of claim 1, wherein said lever has two bearing points along its rotation axis.

13. The sensor of claim 1, wherein said ring arranged on said second arm of said lever is arranged beneath a central point of said ball.

14. The sensor of claim 13, wherein the center of gravity of said lever in relation to said rotation axis of said lever lies on the side of said first arm.

15. The sensor of claim 1, wherein the center of gravity of said lever in relation to a rotation axis of said lever lies on the side of said second arm.

16. A belt retractor for vehicle safety belt systems, comprising a sensor of claim 1.

* * * * *